United States Patent [19]

Duvall

[11] 4,078,390
[45] Mar. 14, 1978

[54] REMOVAL AND RECOVERY OF SULFUR DIOXIDE FROM STACK GASES

[76] Inventor: Lee J. Duvall, 1855 Trevilian Way, Louisville, Ky. 40205

[21] Appl. No.: 735,311

[22] Filed: Oct. 29, 1976

Related U.S. Application Data

[63] Continuation of Ser. No. 603,814, Aug. 12, 1975, abandoned, which is a continuation-in-part of Ser. No. 549,150, Feb. 12, 1975, Pat. No. 3,994,706.

[51] Int. Cl.² ............................................. F25J 3/06
[52] U.S. Cl. .......................................... 62/11; 62/37; 55/73; 55/84; 55/20; 55/21
[58] Field of Search ........................ 62/9–11, 62/23, 37; 159/47 WL, 4 A; 162/36; 423/210, 242, 540; 55/73, 84, 20, 21

[56] References Cited

U.S. PATENT DOCUMENTS

| | | | |
|---|---|---|---|
| 1,939,695 | 12/1933 | Hasche | 62/10 |
| 2,805,734 | 9/1957 | Riess et al. | 62/23 |
| 2,984,078 | 5/1961 | Schmidt et al. | 62/9 |
| 3,230,724 | 1/1966 | Havas | 62/11 |

*Primary Examiner*—Hiram H. Bernstein
*Attorney, Agent, or Firm*—Bacon & Thomas

[57] ABSTRACT

An improved method and apparatus for the removal and recovery of sulfur dioxide and water vapor from gaseous effluent is disclosed. Sulfur dioxide and water vapor entrained in stack gases, emanated upon combustion of sulfur-bearing materials, are selectively liquefied under the combined influence of a reduction in temperature and an increase in pressure of the gaseous effluent. System efficiency is enhanced through proper routing of effluent gases and condensate and the incorporation of a condensate spray curtain.

9 Claims, 1 Drawing Figure

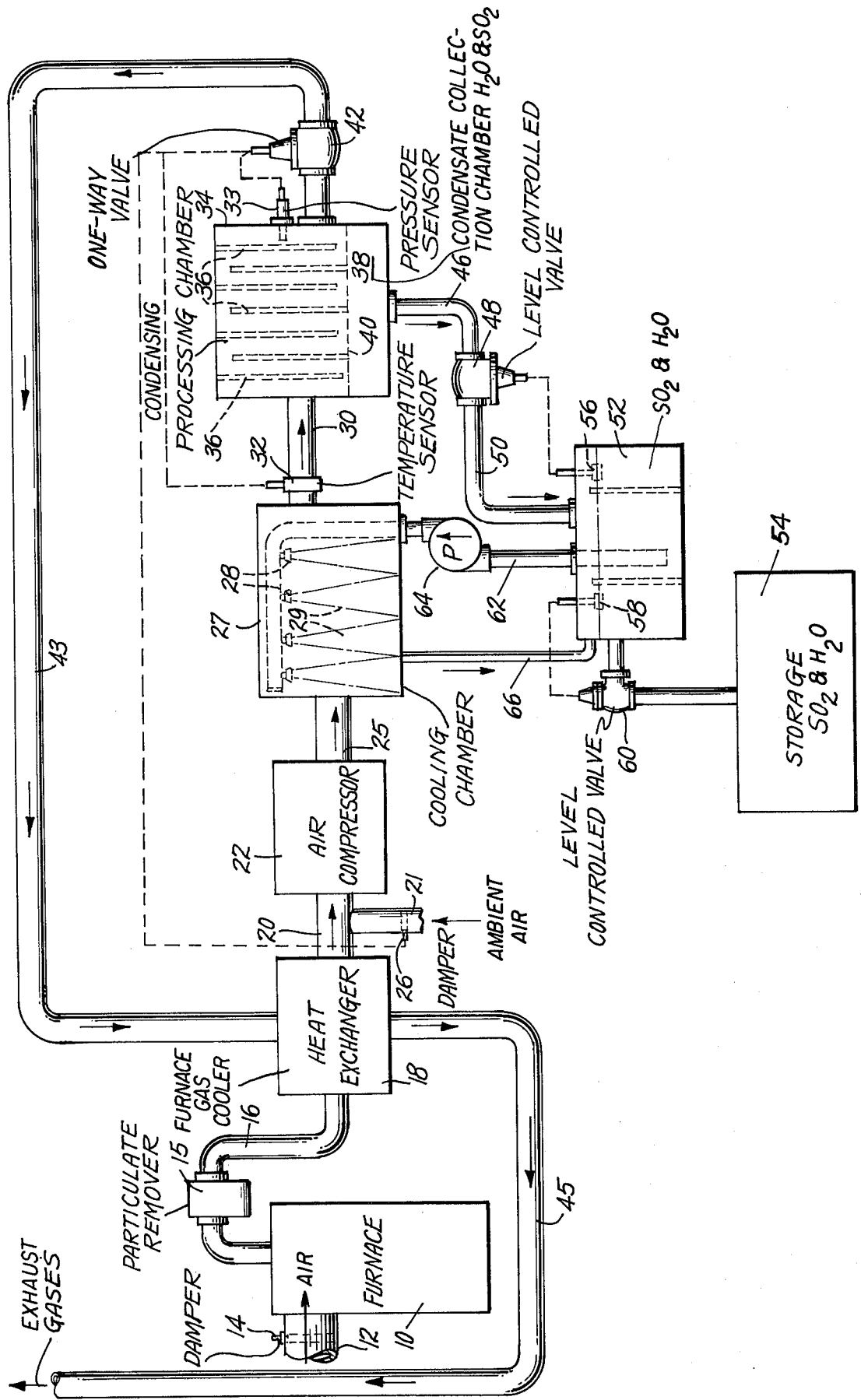

REMOVAL AND RECOVERY OF SULFUR DIOXIDE FROM STACK GASES

CROSS-REFERENCE TO RELATED APPLICATIONS

This is a continuation of application Ser. No. 603,814, filed Aug. 12, 1975, now abandoned, which in turn was a continuation-in-part of the co-pending application, Ser. No. 549,150, filed Feb. 12, 1975, now U.S. Pat. No. 3,994,706, incorporated herein by reference and relied upon.

BACKGROUND OF THE INVENTION

1. Field of the Invention

The present invention relates to an improved, simple, yet efficient method and apparatus for the extraction of sulfur dioxide and water vapor from gaseous effluent emitted upon combustion of sulfur-bearing materials.

Recent widespread attention has been directed toward the environmental impact attendant the combustion of sulfur-bearing fuels as the source of essentially sulfur-free fuels becomes exceedingly scarce. As these sulfur-bearing fuels are combusted in, for example, the production of electrical power, copious quantities of sulfur dioxide, partially associated with water vapor, are generated and must be removed from the gaseous effluent before discharge thereof to the atmosphere. The present invention is directed to both achieving these ends and, additionally, providing for the easy recovery of sulfur dioxide in commercially usable form.

2. Description of the Prior Art

Many techniques have been developed to remove noxious sulfur dioxide from stack gases emitted upon combustion of sulfurous fuels. Chemical scrubbers and catalytic, fluidized beds have been advanced for these purposes; however, most often these are complex apparatus of high cost which, while removing the sulfur dioxide component, generally do not yield an easily recoverable end product, should such be desirable.

Similarly, other systems employ extractive techniques for the removal of sulfur dioxide from the gaseous effluent which yield sulfur dioxide trapped in a catalytic or absorbent agent. Thus, not only is recovery of the sulfur dioxide made more difficult but, additionally, the catalyst or sorbent must then be regenerated after a relatively short amount of time to render same continuously useful.

Other systems rest upon the ease of liquefaction of sulfur dioxide from its gaseous state for their efficacy. See, for example, Hasche U.S. Pat. Nos. 1,810,312 and 1,939,694. However, such systems too present considerable drawbacks. For instance, and quite importantly, furnace efficiency may be reduced as the result of surging through the system.

Accordingly, tne need exists to efficiently, yet simply, extract sulfur dioxide and associated water vapor from gaseous effluent emitted from the combustion of sulfur-bearing materials and allow recovery of sulfur dioxide component in a commercially usable form.

SUMMARY OF THE INVENTION

Accordingly, it is a primary object of this invention to efficiently separate sulfur dioxide and associated water vapor from gaseous effluent emitted upon the combustion of sulfur-bearing fuels.

It is another object of this invention to recover the sulfur dioxide in a commercially usable form.

It is yet another object of this invention to provide a simple, yet efficient system which may be adapted to a wide range of furnace parameters without impairing the efficiency thereof.

Other objects and advantages of the present invention will be apparent from the following description of the specific embodiment thereof when taken in conjunction with the FIGURE of drawing and appended claims.

In accordance with the present invention, it has been determined that the foregoing objects and advantages may be realized by air reduction of the gaseous effluent emitted upon combustion of sulfur-bearing materials to liquefy and separate the sulfur dioxide and water vapor components thereof. In carrying out the invention, the stack gases are first cooled in a heat exchanger and subsequently compressed to a degree sufficient to afford liquefaction of sulfur dioxide and condensation of water vapor, followed by recovery thereof through suitable pressure-isolation means to allow constant, uninterrupted operation of the system. The liquid thus recovered is capable of many commercial uses such as, for example, bleaching textile fibers, etc., without further, extensive processing.

System efficiency and, accordingly, utility are enhanced by selective routing of cooled effluent gases in heat-exchange relationship with hot stack gas to aid in the cooling of incoming gas. Cooperating with the liquefaction apparatus is a spray curtain cooling chamber which employs cold condensate to further affect increased efficiency of the system.

BRIEF DESCRIPTION OF THE DRAWING

The FIGURE of drawing is a diagrammatic sketch of the apparatus of the present invention.

DETAILED DESCRIPTION OF THE INVENTION

In order to further illustrate the present invention and the objects and advantages thereof, the following preferred embodiments will be described, the same intended to be illustrative and in no wise limitative.

The present invention rests upon the ease of liquefaction of sulfur dioxide at ambient temperatures and relatively low pressures. Sulfur-bearing fuels combusted in a furnace employed, for example, in the generation of electric power, emit copious quantities of sulfur dioxide, at least partially associated with water vapor, entrained in the gaseous effluent. In my co-pending application, Ser. No. 549,150, filed Feb. 12, 1975, I disclose an efficient method for removal of the sulfur dioxide component from such gaseous effluent. However, certain problems are yet attendant the most effective manner in yielding an exhaust virtually free of sulfur dioxide. Initially, it has been determined that any water vapor present in the stack gases emitted by a furnace complicates maximum extraction since, even at room temperature, water is capable of retaining 50 times its volume of sulfur dioxide. Accordingly, when employing typical fuels in typical furnaces, water vapor will be present within the range of from about 10% to 12% compared with the overall composition of the stack gases, thus minimizing complete removal of sulfur dioxide. Therefore, the instant invention is directed, in part, to an improvement whereby the entrained water vapor component is similarly removed, thus giving rise to increased, overall operating efficiency.

In capsule summary, the stack gases generated upon combustion of a sulfur-bearing fuel are first cooled in a heat exchanger. The cooled effluent, with entrained sulfur dioxide component, is then compressed and directed to a first treatment chamber wherein cold sulfur dioxide condensate is sprayed within the effluent stream to remove a portion of the gaseous sulfur dioxide and water vapor components. The effluent, with the remaining sulfur dioxide and water vapor, is then directed to a second processing chamber wherein the last vestiges of sulfur dioxide and water vapor are removed by the combined action of a reduction in temperature and an increase in pressure. A portion of the sulfur dioxide condensate may then be employed in the first process chamber while the remainder is routed to a collection chamber via pressure isolation means in order that the overall system operates isobarically and without surging. The collected liquid sulfur dioxide may then be employed for other commercial uses.

The sulfur dioxide-free exhaust gases, which have been substantially cooled by the system, are similarly discharged under controlled pressure to preclude surging through the furnace which would, of course, result in uneven and inefficient operation thereof. These cooled exhaust gases are routed through the heat exchanger, or in otherwise heat-exchange relationship with the stack gas, in order to enhance cooling capabilities while minimizing outside power requirements.

Moreover, by proper routing of the effluent streams, the system environment may be closely regulated for maximum efficiency. For example, when the system is operated in a hot ambient environment, a portion of the cooled exhaust gas may be diverted for purposes of cooling the system surroundings. Should, to the contrary, the system be required to operate in a relatively cold environment, the hot stack gases may be employed to heat the system surroundings before being subjected to the sulfur dioxide and water vapor removal system. Accordingly, very favorable economics may be realized from practicing the instant invention.

Referring to the FIGURE of drawing, there is shown diagrammatically a system according to the present invention for use in the abatement of air pollution resulting from the release of sulfur dioxide to the atmosphere as the result of combustion of sulfur-bearing fuels. These fuels, typically coal or oil, are combusted in a furnace 10 to, for example, provide steam for the generation of electrical power. The furnace, as is conventional, is equipped with an inlet duct 12 which, additionally, incorporates a damper 14 to be more fully described hereinbelow. Gaseous effluent resulting from the combustion of the fuel and containing considerable quantities of sulfur dioxide, at least partially associated with water vapor, is removed from furnace 10 via an exit duct 16 and is thence directed to a heat exchanger 18. Optionally, in order to further increase system efficiency, particulate removal means 15 may be employed. Such apparatus as precipitators, bag filters, and the like are well known in the art and require no greater description herein. Typically, the gaseous effluent emitted from furnace 10 will arrive at heat exchanger 18 at a temperature of approximately 150° C. However, depending upon the efficiency of the furnace or other operating parameters, the temperature of the effluent may range between 100° and 200° C.

Recognizing that sulfur dioxide possesses a critical temperature of approximately 158° C., it is necessary that the gaseous effluent be cooled to at least that temperature and, preferably, to within the range of approximately 55° C. to 65° C. Most preferably, this effluent will be cooled to within the range of approximately −1° to +5° C. The necessary cooling is achieved by heat exchanger 18 which may be of any variety well known to the skilled artisan; for example, countercurrent liquid or air. Most preferably, heat exchanger 18 is a fin-type heat exchanger which employs heat pipe technology. These heat exchangers operate in a nearly isothermal manner, thus providing high recovery efficiency. Also, there are no moving parts requiring routine maintenance and there are no external power requirements, thus contributing to both efficiency and economy of operation. As shown in the FIGURE of drawing, the cooled exhaust gases may be routed through heat exchanger 18 to further enhance efficiency. These cooled gases are then directed to an air compressor 20 via exit duct 20, which is provided with an auxiliary duct 21 containing a damper 26.

Compressor 22 may be of any well known variety including rotary, rotary screw, centrifugal, and the like. While the absolute manner in which the compressor operates is not of extreme concern, it is essential that the load capabilities of compressor 22 be greater than the CFM requirement of furnace 10. Once the CFM requirement for maximum efficiency of furnace 10 has been calculated, without regard to the sulfur dioxide removal system, compressor 22 should be selected in order that it possesses an excess capability of at least 10% to 15% over the necessary, optimum flow rate through the furnace 10. This excess capacity thus compensates for volume losses through the sulfur dioxide removal system. In concert with air compressor 22, damper 26 controllably admits ambient air through auxiliary duct 21. In effect, damper 26 operates as a compensator valve to offset differences in the volume of stack gases leaving the furnace and the volume drawn by compressor 22, the admission of the ambient air thus equalizing the CFM requirement of furnace 10.

In order to effect separation of the sulfur dioxide component from the gaseous effluent, it is necessary to compress the gases to a degree corresponding to the pressure-temperature thermodynamic relationship of the vapor/liquid equilibrium of sulfur dioxide. This degree of compression is automatically determined by first sensing the temperature of the gaseous effluent by temperature sensor 32, which may be of any convenient design and provide electrical, mechanical or hydraulic output to valve 42, which is then automatically controlled to provide the desired degree of compression in the system. For example, for gaseous effluent which has been cooled to approximately 25° C., there will be required a degree of compression resulting in an absolute pressure of approximately 4 kgm/cm$^2$ (58 p.s.i.) to initiate liquefaction of the sulfur dioxide component. Due to such considerations as the rise in temperature of the gaseous effluent accompanying compression in air compressor 22 (i.e., heat of compression), it is desirable to provide a pressure of at least, approximately, 5 to 6 kgm/cm$^2$ absolute. Also, chemical interaction between the effluent components will necessitate a somewhat higher degree of compression than theoretical.

The compressed gases are passed from compressor 22, via duct 25 to a first cooling chamber 27, which is a spray curtain cooling chamber modified for particular use in conjunction with the instant sulfur dioxide removal system. Spray curtain cooling chamber 27 has a plurality of heads, 28, which generate spray columns 29. As will be described more fully hereinbelow, retrieved condensate of sulfur dioxide is pumped to cooling chamber 27, the condensate forming the plurality of spray columns of finely dispersed sulfur dioxide.

The compressed gases emanating from compressor 22 will have experienced an increase in temperature due to the heat of compression thereof. The cooling chamber 27 offsets, to a large degree, this increased heat of compression as the spray columns are generated from cold condensate having a temperature of from about 1° to 5° C. The action of this spray curtain will effect an initial, partial, removal of sulfur dioxide from the effluent as well as an initial separation of water vapor due to a propensity for condensation upon the cold condensate particles in spray columns 29, in conjunction with the increased pressure accompanying the action of compressor 22. The effluent gas, having undergone partial removal of sulfur dioxide and water vapor, exits spray cooling curtain chamber 27 via duct 30, which is provided with a temperature sensor, and is directed to processing chamber 34.

The compressed effluent entering process chamber 34 is caused to follow a sinuous route about baffle member 36 upon which the sulfur dioxide component liquefies due to the reduction in temperature provided by heat exchanger 18 and increase in pressure provided by air compressor 22. The processing chamber 34 is divided to provide a lower, collection chamber 38 by a perforated panel 40. Thus, the liquid sulfur dioxide removed from the gaseous effluent will drain downwardly on baffle members 36 through perforated panel 40 and collect in chamber 38.

Temperature sensor 32 operates in concert with pressure sensor 33 and one-way valve 42, together with dampers 14 and 26. As heretofore noted, it is essential that furnace 10 operates at a constant CFM, without surging, in order that the efficiency thereof is maximized. As demand changes are made upon the furnace, the pressure-temperature relationship necessary for effective separation of both the sulfur dioxide and water vapor, as well as the volume flow of gaseous effluent, will be effected. As such changes occur, temperature sensor 32 will provide an appropriate signal, which may be electrical, hydraulic, or mechanical, which controls one-way valve 42 thereby allowing appropriate change in the volume flow rate of effluent from the system, which bears directly upon the pressure therein. In conjunction with this operation, pressure sensor 33 similarly signals valve 42 an indication that the required pressure in process chamber 34 has been attained. Due to the vagaries of operating flow rates, dampers 14 and 26 are automatically adjustable to provide a wide range of flow rates through the system. Specifically, damper 14 is selectively adjustable to afford a constant flow rate through furnace 10 at that rate most efficient therefor, and this rate is independently variable over the entire range of operating parameters of the furnace without regard to those of the appended removal system. As operating parameters of the removal system vary in response to the pressure/temperature demands therein, air is selectively admitted to the system via damper 26 to afford the most efficient removal of liquid sulfur dioxide.

If, for example, furnace 10 requires 10,000 CFM of air for most efficient operation, the total volume of air will be admitted through damper 14. Due to the quality of fuel employed, the volume of stack gas may vary slightly, but this will have little, if any, effect upon these initial requirements. The intake of compressor 22 draws air through damper 14 while damper 26 is correspondingly adjusted, preferably automatically, to ensure this constant 10,000 CFM of air through furnace 10. If the required pressure in processing chamber 34 varies in response to, for example, a change in temperature, damper 26 is automatically opened or closed to ensure proper operating conditions while yet allowing constant flow through furnace 10. Accordingly, the system is capable of effective and efficient removal of sulfur dioxide and water vapor from the gaseous effluent over an adjustably controllable range of from about 100 CFM to about 100,000 CFM.

As note above, it is most desirable to remove water vapor entrained in the stack gases since water is capable of absorbing many times its own volume of sulfur dioxide. To effect efficient removal of water vapor, it has been determined that the optimum operating parameters for processing chamber 34 be a temperature of approximately 4° to 5° C. and a pressure up to about 7 kgm/cm$^2$ (100 p.s.i.) to yield to dew point of about 4° to 5° C. When operating within this range, the exhaust gas will be about 99% free of water vapor.

The liquid sulfur dioxide and condensed water vapor collected in chamber 38 are removed via exit duct 46, through level controlled valve 48 and duct 50 to isolation chamber 52 which allows routing of the condensate to a storage facility 54 without effecting the system pressure in process chamber 34.

As the level of liquid sulfur dioxide falls below a predetermined point, a float 56 causes level control valve 48 to open admitting condensate from collection chamber 38 to chamber 52. Simultaneously with the opening of valve 48, a float 58 causes level control valve 60 to be shut. As the liquid level rises, these floats 56, 58 cause corresponding valves 48, 60 to close and open, respectively, thus allowing the liquid in isolation chamber 52 to be transferred to storage. Accordingly, the fluid is removed from the system under substantially isobaric conditions.

Cold condenste stored in isolation chamber 52 at a temperature of from about 1° to 5° C., may then be employed as the source of spray cooling columns 29 heretofore described. Obviously, until the system has been in operation long enough to collect significant quantities of condensate, spray curtain cooling chamber 27 is inoperable. However, once the level of condensate in isolation chamber 52 has reached a steady state, a portion thereof may be removed via pipe 62 by the action of a pump 64 to the nozzle heads 28. The spray columns 29 will, as noted, aid in the reduction of the temperature of the gaseous effluent and simultaneously effect initial, partial removal of the sulfur dioxide and water vapor components. Liquid collecting in chamber 27 is returned to isolation chamber 52 via pipe 66.

Removal of sulfur dioxide and water vapor from the gaseous effluent yields a cold residuum for discharge to the atmosphere. This cold residuum passes through one-way valve 42 under controlled pressure conditions, described above, and is selectively routed in proximity with heat exchanger 18 or is otherwise caused to pass in heat-exchange relationship with the hot, incoming effluent thereby reducing overall demands on the system. Thence, it is discharged via duct 45.

Similarly, the cold residuum may be employed, alone or in concert with hot stack gases, to affect environmental control of the surroundings of the system. That is, by properly routing the hot and/or cold gas streams in heat-exchange relationship with the environs of the apparatus, they may be maintained within a regulated temperature range of from about 10° C to about 16° C. Such a feature yet further enhances the operation efficiency and economy of the system. For example, the hot stack gases may be selectively passed through a conventional heat radiator to appropriately heat the ambient. Similarly, when cooling is desired, the cold exhaust gas from duct 43 may be selectively diverted through air contitioner-type radiators.

While the invention has been described and illustrated with reference to a certain preferred embodiment thereof, those skilled in the art will appreciate that various modifications, changes, omissions and substitutions can be made without departing from the spirit of the invention. It is intended, therefore, that the invention be limited only by the scope of the following claims.

What is claimed is:

1. The method for modification of a gaseous effluent, emitted upon combustion of sulfur-containing materials in a furnace having a predetermined optimum flow rate of air thereto for most efficient operation thereof, by removal and recovery of sulfur dioxide and water vapor from said effluent prior to discharge thereof to the atmosphere, said method comprising the steps of:
    a. cooling said gaseous effluent;
    b. compressing said gaseous effluent;
    c. sensing the pressure of the cooled and compressed effluent;
    d. sensing the temperature of the cooled and compressed effluent;
    e. liquifying sulfur dioxide and water vapor entrained in said effluent by maintaining the temperature/pressure relationship of said cooled and compressed effluent below the thermodynamic equilibrium point for liquefaction of sulfur dioxide and water vapor from said effluent, to yield a modified residuum effluent essentially free from sulfur dioxide and water;
    f. controlledly discharging said modified residuum effluent to the atmosphere through discharge flow means in response to the sensed pressure and temperature of said cooled and compressed effluent whereby said temperature/pressure relationship is maintained by adjusting the volume flow rate of modified residuum effluent discharged;
    g. admitting a volume of air through damper flow means to said effluent upstream of said discharge flow means to directly compensate for increases and decreases in the volume flow rate of modified residuum effluent discharged, whereby surging through the furnace is precluded, thus maintaining constant said optimum flow rate of air thereto while allowing the adjustment of the volume flow rate of modified residuum effluent discharged; and,
    h. contacting said effluent with sulfur dioxide and water condensate prior to said liquifying step.

2. The method of claim 1 wherein said discharging step includes routing said residuum in heat-exchange relationship with said gaseous effluent prior to discharging said residuum to the atmosphere.

3. The method of claim 1 further including the step of collecting said liquefied sulfur dioxide and recycling a portion thereof to said contacting step.

4. The method of claim 1 wherein said effluent is cooled to a temperature within the range of about 1° C. to about 5° C. and is compressed to a pressure of up to at least about 100 p.s.i.g.

5. The method of claim 1 further comprising the step of regulating the environment under which said method is practiced by selectively routing said residuum and/or said gaseous effluent in heat-exchange relationship of the environs wherein said method is practiced whereby the temperature of said environs is maintained within the range of from about 10° C to 16° C.

6. An apparatus for modification of a gaseous effluent, emitted upon combustion of sulfur-containing materials in a furnace having a predetermined optimum flow rate of air thereto for most efficient operation thereof, by removal and recovery of sulfur dioxide and water vapor from said effluent prior to discharge thereof to the atmosphere, said apparatus comprising:
    a. means for cooling said gaseous effluent;
    b. means for compressing said gaseous effluent in operative communication with said cooling means;
    c. means for sensing the pressure of said cooled and compressed effluent;
    d. means for sensing the temperature of said cooled and compressed effluent;
    e. means for liquifying sulfur dioxide and water vapor entrained in said effluent by maintaining the temperature/pressure relationship of said cooled and compressed effluent below the thermodynamic equilibrium point for liquefaction of sulfur dioxide and water vapor from said effluent, to yield a modified residuum effluent essentially free from sulfur dioxide and water;
    f. means for controlledly discharging to the atmosphere said modified residuum effluent, in operative communication with said liquifying means, said discharging means being adjustable in response to the sensed pressure and temperature of said cooled and compressed effluent whereby said temperature/pressure relationship is maintained by increasing or decreasing the volume flow rate of modified residuum effluent discharged;
    g. means for admitting a volume of air to said effluent, upstream of said discharging means, to directly compensate for increases and decreases in the volume flow rate of modified residuum effluent discharged, whereby surging through the furnace is precluded, thus maintaining constant said optimum flow rate of air thereto while allowing the adjustment of the volume flow rate of modified residuum effluent discharged; and,
    h. means for contacting said gaseous effluent with liquid sulfur dioxide and water condensate upstream of said discharging means.

7. The apparatus of claim 6 further including means for collecting liquid sulfur dioxide and recycling a portion thereof to said contacting means.

8. The apparatus of claim 6 further including means for selectively routing said residuum in heat-exchange relationship with said gaseous effluent.

9. The apparatus of claim 6 further comprising means for selectively routing said residuum and/or said gaseous effluent in heat-exchange relationship with the environs of said apparatus whereby the environment thereof is regulated within a temperature range of from about 10° C to 16° C.

* * * * *